UNITED STATES PATENT OFFICE.

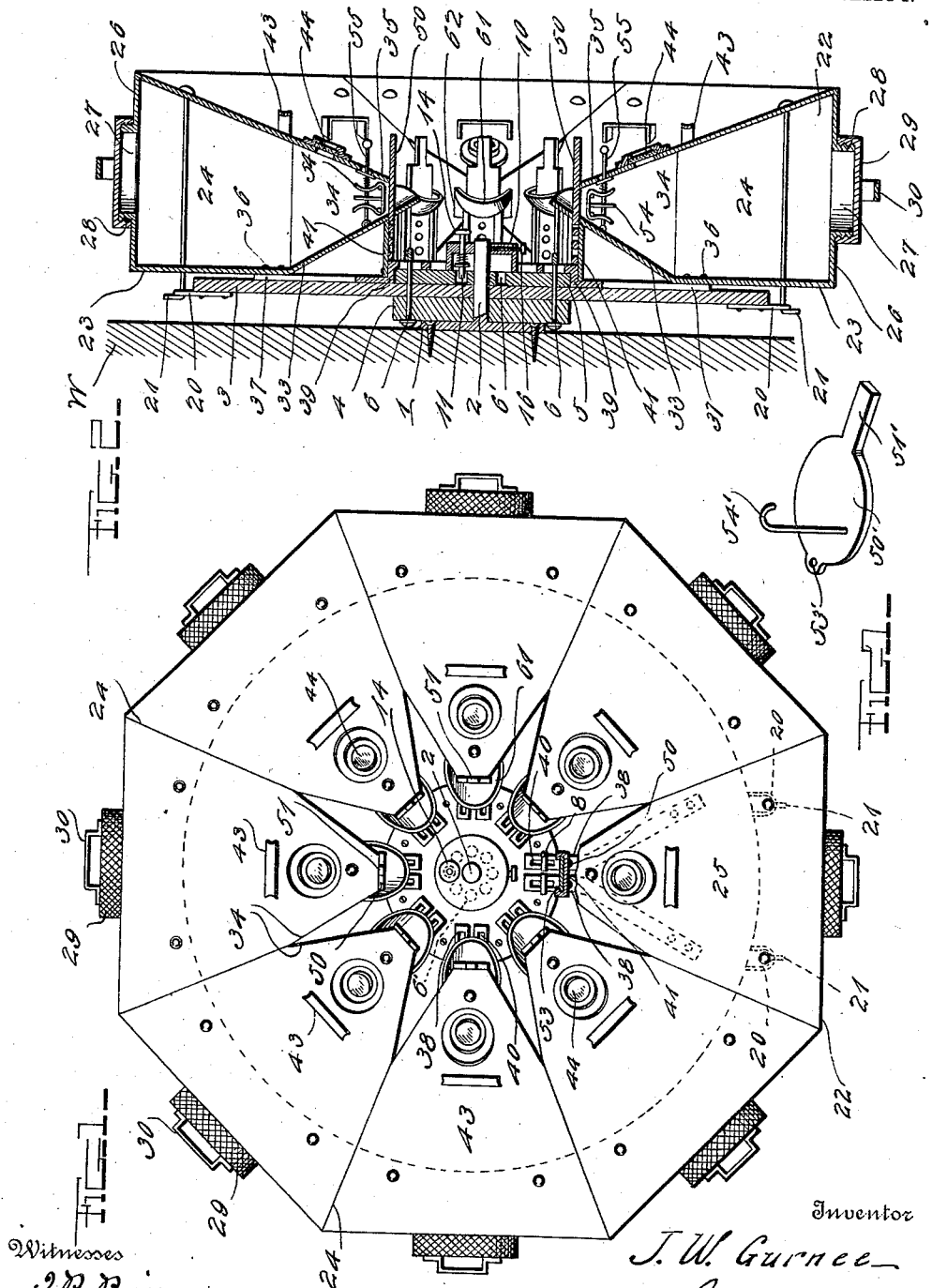

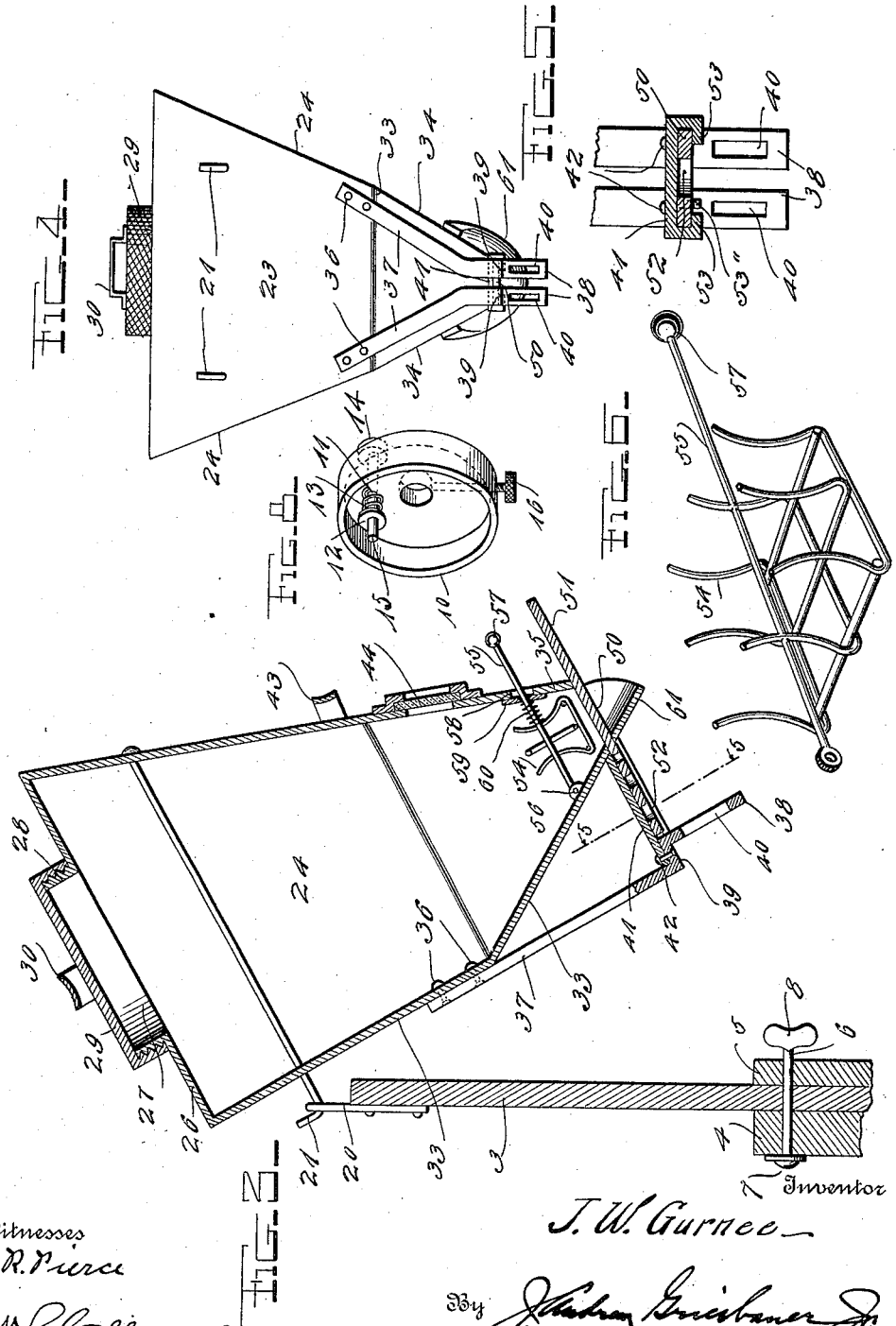

JOHN WINFIELD GURNEE, OF NUNDA, NEW YORK.

ROTARY KITCHEN-CABINET.

1,044,882.     Specification of Letters Patent.     Patented Nov. 19, 1912.

Application filed February 1, 1912. Serial No. 674,665.

*To all whom it may concern:*

Be it known that I, JOHN WINFIELD GURNEE, a citizen of the United States, residing at Nunda, in the county of Livingston and State of New York, have invented certain new and useful Improvements in Rotary Kitchen-Cabinets, of which the following is a specification.

This invention relates to furniture, and more especially to kitchen cabinets; and the object of the same is to produce a cabinet of this kind whereof the various bins are each removable as a separate entity so that an empty bin may be replaced by a filled one with only a momentary interruption to the usefulness of the entire cabinet. This and other objects are accomplished by the construction hereinafter more fully described and claimed, and as shown in the drawings wherein—

Figure 1 is a front elevation of this cabinet complete, and Fig. 2 a central vertical sectional view thereof. Fig. 3 is an enlarged vertical sectional view through the upper portion of the rotary disk and one bin, showing the latter tilted slightly as in the act of being removed or replaced. Fig. 4 is a rear elevation of one bin removed from the disk. Fig. 5 is an enlarged sectional detail on the line 5—5 of Fig. 3. Fig. 6 is an enlarged perspective detail of my preferred form of agitator, and Fig. 7 is a similar view of another form of agitator which is mounted on the gate. Fig. 8 is an enlarged perspective detail of the collar with the locking devices carried thereby.

This improved cabinet is intended to rotate on a horizontal axis supported by any suitable upright such as a wall W, and by preference the support therefor consists of a plate 1 secured to said wall and having a pivot pin 2 projecting rigidly from it as best seen in Fig. 2, and on this pin rotates a disk 3 having an enlarged hub 4 and a face plate 5 provided around its axis with a series of sockets 6′ best seen in dotted lines in Fig. 1, there being as many sockets as there are bins and eight being shown in the present instance. The hub plate 4 and face plate 5 are clamped against opposite sides of the disk 3 by means of a series of bolts 6 passing through all three members, their nuts 7 being preferably disposed behind the hub and around the plate 1, and their heads 8 being laterally elongated into the shape of thumb-pieces for a purpose to appear. The rotary support thus built up is held upon the pin 2 by means of a cup-shaped collar 10 best seen in Fig. 8, its size being sufficient to inclose the series of sockets 6′ as seen in Fig. 2 and its depth sufficient to permit it to contain a bolt 11 carrying a stop 12 and an expansive spring 13 coiled upon the bolt between said stop and the bottom of the cup-shaped collar as shown. The head 14 of said bolt projects outward or away from the wall, while its tip 15 is projected by the spring 13 into the sockets 6′ as the latter come successively into register therewith. This collar is held upon the pivot pin 2 by any suitable means, such as a set screw 16 whose head is also external thereof and within reach of the operator, and when this set screw is removed the collar and the rotating part can be withdrawn from the pivot pin 2.

Carried by the rotary support which is composed of the parts hereinbefore described, is a series of bins whereof eight are illustrated in the present instance, although there may be more or less. Their size and shape is such that they occupy the entire face of the disk 3 and project slightly over its periphery as shown, while the details of their construction and the materials of their parts may be left to the manufacturer. As these bins and their manner of attachment to the disk duplicate each other, I need describe but one, and I have amplified the illustration of the lowermost bin in Fig. 1 for the purpose of a clearer showing.

Secured to and projecting from the edge of the disk is a pair of eyes 20 adapted to be engaged by hooks 21 which in turn are secured to or pass horizontally through the body of the bin proper, numbered 22. By preference the latter has a flat upright back 23, converging sides 24, an inwardly inclined front 25, and a horizontal top 26 pierced with a filling opening 27 surrounded by a threaded collar 28, and on the latter screws a closing cap 29 of ample size and preferably having a handle 30. The lower end of the bin constitutes a hopper or chute for discharging the contents therefrom, and is preferably constructed with a forwardly inclined back 33, sides 34 which converge more rapidly than do the sides 24 of the bin itself, and a front 35 which may well follow the line of the front 25 of the bin and even be of one piece therewith.

Secured as at 36 to the back 23 are one or more brackets (best seen in Fig. 4) whose bodies 37 converge toward each other and whose lower ends 38 stand parallel, and said lower ends are bent forward and then downward in a double angle producing a shoulder 39, below which they have slots 40 for the reception of the heads 8 of the bolts 6 referred to above. As the entire bracket depends vertically from the upright back 23, a brace 41 is inserted between it and the inclined back 33 of the chute, and this brace may well be secured upon the shoulder 39 as at 42 and be a plate having a function to be set forth below. The lower face of said shoulder is so disposed with reference to the hooks 21 that when the latter engage the eyes 20 the shoulders of the two brackets will slip over the periphery of the face plate 5 just as the slots 40 engage over the heads 8 of the bolts 6, and thereby the entire bin is reliably supported by said plate 5 and prevented by the hook-and-eye engagement from tilting forward on the rotary support first described above. When the bolts 6 are turned so that their heads 8 stand upright as seen in Fig. 3, the bin may be swung forward around its hook-and-eye connection, disengaged therefrom, removed entire, and replaced by another bin which has meanwhile been filled. For the purpose of swinging the bin forward in this manner, its front is provided with a handle 43; and for the purpose of ascertaining when its contents get low, the front of the chute is provided with a sight opening covered with glass as indicated at 44.

The lower end of the chute is closed by a gate of any desired construction, but I preferably use a sliding gate consisting of a board 50 having a handle 51 at its front end and a series of holes 52 through its body near its rear end and made larger and larger as they approach the latter so that by pulling the gate out farther and farther the size of the outlet aperture may be increased to the size of the granules of the commodity within the bin or the speed with which it is desired to withdraw the contents therefrom. The plate 41 acts as a cover for this gate and protects it from dust, and its edges may well be turned under into guides 53 as best seen in Fig. 5. In conjunction with this gate I use an agitator best seen in Figs. 3 and 6, the same consisting of a skeleton structure 54 as of stout wire, secured to a rod 55 which is pivoted as at 56 to the back of the chute and has a handle 57 at its front end. In order that this handle may be within reach of the operator, the rod 55 is projected through a slot 58 in the front wall of the chute, said slot being protected by a plate 59 inside the chute and held against the slot by means of an expansive spring 60 as seen in Fig. 3. If the slot be upright as shown, the operator will reciprocate the handle 57 vertically to move the agitator up and down within the contents of the bin just above the gate, after which the latter can be withdrawn to bring the proper opening 52 under the mouth of the chute, and the contents flow out. Beneath the gate I also preferably secure a spout 61, which may well be of sheet metal having side flanges 62 as seen in Fig. 2, and the body of this spout is dished and inclined forward so that the material running out of the chute will be deflected into any receptacle the user may hold beneath it. Another form of agitator best illustrated in Fig. 7 includes an upstanding hook-shaped bar 54' rising rigidly from a gate 50' which in this case is made circular and pivoted as at 53' under the plate 41 so that it may be swung aside from beneath the open lower end of the chute by means of a handle 51' projecting forward from it. While this is a simpler form of gate, its support is not so strong and I prefer therefore to use it only when the size of the bin is rather smaller than usual where this entire cabinet is of the liberal dimensions and proportions indicated in the drawings.

Thus is built up a kitchen cabinet whose various bins may contain granular commodities such as are necessary or desirable in the kitchen, or—if the device be used on a larger scale and in a store—may contain those commodities for which there is frequent demand. The front of each bin will doubtless be provided with a legend indicating what it contains, or the sight-opening 44 may be of sufficient size to permit the operator to see the contents at a glance. Assuming that a customer calls and wants some rice, and it so happens that rice be contained within the lowermost bin shown in Figs. 1 and 2; the dealer grasps the head 14 of the bolt 11 and draws forward on it slightly so that its tip 15 is withdrawn from the uppermost socket 6', and then using his other hand he rotates the entire device upon its pivot pin until the bin now shown at the bottom comes to the top. Then releasing his hold upon the bolt which springs into the proper socket to hold the device against further rotation, he places his scale pan beneath the lower end of the uppermost spout 61 and draws forward on the handle 51 (or moves the handle 51' to one side), with the result that some of the rice within the now uppermost bin runs out through the uncovered mouth of the chute and is deflected forward by the spout 61 into the receptacle. When the later contains sufficient, the operator closes the gate to shut off the flow, and leaves the entire device standing in this position until the next customer calls or the next demand for a commodity occurs. From time to time the contents of the various bins will become low, but the matter of their replenishment may well be taken charge of by the janitor so that the salesmen in the store need have no concern. With this end in view I provide one or perhaps two additional bins, and as soon as it is seen that the contents of some bin is becoming low, one of the extra bins is filled and brought to the cabinet by the janitor or the person in charge. Even in rush hours, it will take but a moment for him to change the position of the heads 8 of the two bolts 6 indicated at the bottom of Fig. 1, so that the slots 40 in the lower ends 38 of the brackets on the empty bin may be slipped off and the entire bin unhooked; and by a reversal of this process the new filled bin can be substituted therefor and the empty bin carried away to be used again. Attention is directed to the fact with either form of gate it is my intention that the same shall come off with the bin as does its closure 29 so that its contents may not escape. The gate shown in Fig. 7 is pivoted as at 53' to the lower end of the chute, while the gate shown in Fig. 5 is engaged by the guides 53 and may well have a pin or screw 53'' to prevent it from being withdrawn too far. The movement of the gate illustrated in Fig. 7 automatically causes the movement of the agitator, but with the construction shown in Fig. 3 it will be necessary to move the handle 57 of the agitator before opening the gate.

The parts of this device are of the desired sizes, shapes, proportions and materials, and changes in details or additions thereto may be made without departing from the principle of my invention.

Although the preferred embodiment of this invention as shown in the accompanying drawings represents a rotary kitchen cabinet, I do not limit myself to this form, but my invention may be used in grocery stores holding articles to be sold, or in barns or stables for holding grain and feed which is to be used as food for horses and cattle, or in hotels, bakeries, flour and feed mills, and for many other purposes as will be apparent to those skilled in the art.

What is claimed as new is:

1. In a kitchen cabinet, the combination of a horizontal pivot pin, an upright support rotatably mounted thereon, a series of bins carried by said support and disposed around said pin with their mouths directed radially inward toward it, delivery chutes at their inner ends, gates for independently opening or closing said chutes, and spouts under said chutes and inclined axially away from said pivot.

2. The combination with a horizontal pivot pin projecting from an upright, and a collar detachably engaging its outer end; of an upright support having a hub rotatably mounted on said pin behind the collar, a series of independent bins carried by said support and having their mouths directed radially toward the pivot thereof, spouts under said mouths and inclined axially away from said pivot, and means on the collar detachably engaging said support for locking any pin above the pivot.

3. In a kitchen cabinet, the combination with a horizontal pivot pin, a collar detachably mounted upon it, a bolt movable through said collar, and a spring pressing the tip of the bolt inward toward the inner end of the pin; of an upright support centrally mounted on said pin, a plate carried thereby and having a series of sockets coming successively under the tip of said bolt, and a series of bins corresponding in number with said sockets and disposed respectively opposite thereto with their mouths opening radially to said pin.

4. In a kitchen cabinet, the combination with a horizontally projecting pivot pin, an upright support centrally pivoted thereon, a face plate also pivoted on said pin, and a series of bolts passing through the support and plate and having laterally elongated heads; of a series of bins disposed radially around said pin, a hook-and-eye connection between each bin and the support, and on each bin a bracket secured thereto and having a shoulder adapted to engage the outer edge of said face plate and a slot adapted to engage the elongated head of one of said bolts.

5. The combination with a bin having an upright back, a chute continuing the lower end of the bin and having a discharge opening at its bottom with an inclined back leading from the back of the bin to said opening, and a supporting bracket whose body is connected with the back of the bin and depends behind the back of the chute and is provided with a shoulder; of a plate extending from said shoulder to the back of the chute and having guides on its edges, and a gate sliding in said guides and extending across the open lower end of the chute, the body of the gate having a series of openings.

6. The combination with a bin having an upright back, a chute continuing the lower end of the bin and having a discharge opening at its bottom with an inclined back leading from the back of the bin to said opening, and a supporting bracket whose body is connected with the back of the bin and depends behind the back of the chute; of a plate secured at its rear end to said bracket and at its front end to the back of the chute, guides beneath the plate, and a gate movable in said guides and across the open lower end of the chute and having an opening in its body and a handle at its front end.

7. The combination with a bin, a chute continuing its lower end and having converging walls one of which is provided with a slot, and a gate adjustably closing the lower end of said chute; of a rod pivoted within said chute and extending through said slot and having a handle at its front end, an agitator mounted on said rod within the chute, a plate mounted on the rod over said slot on the inside of the chute, and an expansive spring between the plate and agitator.

In testimony whereof I have hereunto set my hand in the presence of two subscribing witnesses.

JOHN WINFIELD GURNEE.

Witnesses:
JOHN M. PERRY,
CORYDON L. GILBERT.

Copies of this patent may be obtained for five cents each, by addressing the "Commissioner of Patents, Washington, D. C."